US010170101B2

(12) United States Patent
Carr et al.

(10) Patent No.: US 10,170,101 B2
(45) Date of Patent: Jan. 1, 2019

(54) SENSOR BASED TEXT-TO-SPEECH EMOTIONAL CONVEYANCE

(71) Applicant: International Business Machines Corporation, Armonk, NY (US)

(72) Inventors: Kevin G. Carr, Poughkeepsie, NY (US); Thomas D. Fitzsimmons, Elverson, PA (US); Johnathon J. Hoste, Poughkeepsie, NY (US); Angel A. Merchan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/791,963

(22) Filed: Oct. 24, 2017

(65) Prior Publication Data

US 2018/0277093 A1 Sep. 27, 2018

Related U.S. Application Data (63) Continuation of application No. 15/468,283, filed on Mar. 24, 2017.

(51) Int. Cl.
 *G10L 13/08* (2013.01)
 *G10L 13/06* (2013.01)
 (Continued)

(52) U.S. Cl.
 CPC ............ *G10L 13/06* (2013.01); *G10L 13/043* (2013.01); *G10L 25/63* (2013.01)

(58) Field of Classification Search
 CPC ....................................................... B60W 50/10
 (Continued)

(56) References Cited

U.S. PATENT DOCUMENTS 5,860,064 A 1/1999 Henton
8,065,150 B2 11/2011 Eide
(Continued)

FOREIGN PATENT DOCUMENTS

GB 2444539 A 6/2008

OTHER PUBLICATIONS

IBM Appendix P., "List of IBM Patents or Patent Applications to be Treated as Related", Dated Oct. 24, 2017, 2 pages.
(Continued)

*Primary Examiner* — Huyen Vo
(74) *Attorney, Agent, or Firm* — Aaron N. Pontikos (57) ABSTRACT

A computer-implemented method includes determining, by a first device, a current emotional state of a user of the first device. The current emotional state is based, at least in part, on real-time information corresponding to the user and relates to a textual message from the user. The computer-implemented method further includes determining, by the first device, a set of phonetic data associated with a plurality of vocal samples corresponding to the user. The computer-implemented method further includes dynamically converting, by the first device, the textual message into an audio message. The audio message is converted from the textual message into the audio message based, at least in part, on the current emotional state and a portion of the set of phonetic data that corresponds to the current emotional state. A corresponding computer system and computer program product are also disclosed.

5 Claims, 4 Drawing Sheets (51) Int. Cl.
*G10L 13/04* (2013.01)
*G10L 25/63* (2013.01)

(58) Field of Classification Search
USPC ............ 704/1–10, 230–278; 701/1; 345/473
See application file for complete search history.

(56) References Cited

U.S. PATENT DOCUMENTS

| | | | |
|---|---|---|---|
| 9,323,984 B2 | 4/2016 | Govindarajeswaran et al. | |
| 2005/0159958 A1* | 7/2005 | Yoshimura | G06K 9/00335 704/276 |
| 2006/0224385 A1 | 10/2006 | Seppala | |
| 2008/0269958 A1* | 10/2008 | Filev | B60W 50/10 701/1 |
| 2010/0302254 A1* | 12/2010 | Min | G06F 17/214 345/473 |
| 2011/0093272 A1* | 4/2011 | Isobe | G10L 13/10 704/258 |
| 2015/0235655 A1 | 8/2015 | Dimitriadis et al. | |
| 2015/0242391 A1* | 8/2015 | Goel | G06F 17/2785 704/9 |
| 2016/0078859 A1 | 3/2016 | Luan et al. | |
| 2016/0329043 A1* | 11/2016 | Kim | G10L 13/10 |
| 2017/0315987 A1* | 11/2017 | Srinivasan | G06F 17/241 |
| 2018/0077095 A1* | 3/2018 | Deyle | H04L 51/10 |

OTHER PUBLICATIONS

Adolphs, Ralph, "Recognizing Emotion From Facial Expressions: Psychological and Neurological Mechanisms", Behavioral and Cognitive Neuroscience Reviews, vol. 1, No. 1, Mar. 2002, pp. 21-62.

Houjeij et al., "A Novel Approach for Emotion Classification based on Fusion of Text and Speech", 19th International Conference on Telecommunications (ICT 2012), 6 pages.

Nazmul Haque Nahin et al., "Identifying emotion by keystroke dynamics and text pattern analysis", Behaviour & Information Technology, 2014, vol. 33, No. 9, pp. 987-996, Taylor & Francis, <http://dx.doi.org/10.1080/0144929X.2014.907343>.

Quintana et al., "Heart rate variability is associated with emotion recognition: Direct evidence for a relationship between the autonomic nervous system and social cognition", International Journal of Psychophysiology 86 (2012) pp. 168-172, Elsevier B.V.

Carr et al., "Sensor Based Text-To-Speech Emotional Conveyance", U.S. Appl. No. 15/468,283, filed Mar. 24, 2017, pp. 1-29.

* cited by examiner

SENSOR BASED TEXT-TO-SPEECH EMOTIONAL CONVEYANCE

BACKGROUND

The present disclosure relates generally to sentiment analysis and in particular to providing sentimental affect to text-to-speech systems.

In a digitally centric era, the use of email and short message services ("SMS") (i.e., text-messages) have become the preferred means of communication for many. In addition to email and text-messages, the advent of social media has become a widespread alternative means of communication. One technique for conveying emotion in written text is through the use of emoticons. Emoticons are images that mimic the expressions of the human face, and thus serve as a simple shorthand for conveying an emotional state without directly saying it. Another technique for conveying emotion in written text is through the use of a text-to-speech ("TTS") system. A TTS system converts normal language text into synthesized speech.

SUMMARY

A computer-implemented method includes determining, by a first device, a current emotional state of a user of the first device. The current emotional state is based, at least in part, on real-time information corresponding to the user and relates to a textual message from the user. The computer-implemented method further includes determining, by the first device, a set of phonetic data associated with a plurality of vocal samples corresponding to the user. The computer-implemented method further includes dynamically converting, by the first device, the textual message into an audio message. The audio message is converted from the textual message into the audio message based, at least in part, on the current emotional state and a portion of the set of phonetic data that corresponds to the current emotional state. A corresponding computer system and computer program product are also disclosed.

DETAILED DESCRIPTION

Although there has been a shift in the communications platform used by many, the difficulty in effectively conveying emotion through written text remains. Understanding the relationship between written text and emotion is especially difficult since verbal behaviors (e.g., vocal inflections) and non-verbal behaviors (e.g., physical gestures) typically associated with emotion are eliminated. Accordingly, text-based communication has a reduced capacity for emotional exchange and a greater potential for misinterpreting emotion. Similarly, although current TTS systems are usefully applied to numerous applications (e.g., customer support systems, automated reminders, route information on buses, trains, and automobiles, smartphones, smartwatches, GPS systems), the speech produced by TTS systems is often either in a neutral tone or monotone, which lack emotional characteristics.

Currently, the predominant means of conveying emotion in text-based communications is through the use of emoticons. Emoticons can help to convey difficult to text emotional subtleties. However, embodiments of the present invention recognize that a lack of a standard set of expressive and versatile representations of emotional images only introduces an additional facet of emotional ambiguity. This ultimately limits the usefulness of emoticons. For example, different cultures or regions may adopt alternate representations for the same emotion. The textual representation of the emotion "angry" for some may be ">.<", whereas the textual representation for the same emotion for others may be ": @". Accordingly, there remains an inherent ambiguity in the usage of all but a very few emoticons. Furthermore, the use of emoticons is often limited to only a handful of emotional expressions, such as the prototypical smiley face ":)". This suggests that the set of emoticons that can be effectively used is quite limited. Additionally, embodiments of the present invention recognize that the overuse of emoticons can result in a loss of their emotional impact over time. Moreover, embodiments of the present invention recognize that the use of emoticons has the potential to come across as unprofessional in a business setting.

Another means of conveying emotion in text-based communications is through the use of a TTS system. TTS systems may be usefully applied to numerous applications, such as customer support systems, automated reminders, route information on buses, trains, and automobiles, smartphones, smartwatches, and GPS systems. Generally, a TTS system incorporates rules for the application of vocal attributes. However, current TTS systems generate speech through mathematical manipulations rather than concatenative systems which combine segments of stored natural speech. Furthermore, TTS systems usually incorporate rules for the application of vocal attributes for text to be converted into synthetic speech. However, these rule-based systems result in the generation of generally neutral tones or monotones, which lack emotional characteristics. Thus, current TTS systems are ill-suited for conveying emotional prose at a high level. Some TTS systems may allow for user selection of text and a corresponding emotion to be applied to the selected text. Although this may alleviate the lack of emotional characteristics in synthetic speech creation, the self-selection of various portions of text and corresponding moods is burdensome and time consuming.

Embodiments of the current invention recognize that when communicating through a text-based message, the emotion underlying the message is often left for the reader to interpret based on linguistic style and punctuation alone. Embodiments of the present invention recognize that it would be useful to dynamically generate an audio version of a text-based message. Embodiments of the present invention recognize that it would be useful to dynamically include an audio version of a text-based message at the time the text-based message is transmitted to a recipient. Embodiments of the present invention recognize that it would be useful to analyze and determine an individual's current emotional state at the time a text-based message is generated. Embodiments of the present invention recognize that it would be useful to dynamically generate an audio version of a text-based message that replicates a writer's emotional state through the writer's actual voice and vocal inflections.

Embodiments of the present invention recognize that it would be useful to analyze the words of a text-based message to determine whether the words chosen by an individual match their emotional state at the time the text-based message is generated. Embodiments of the present invention recognize that it would be useful to suggest potential words or phrases that better convey an individual's emotional state. Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
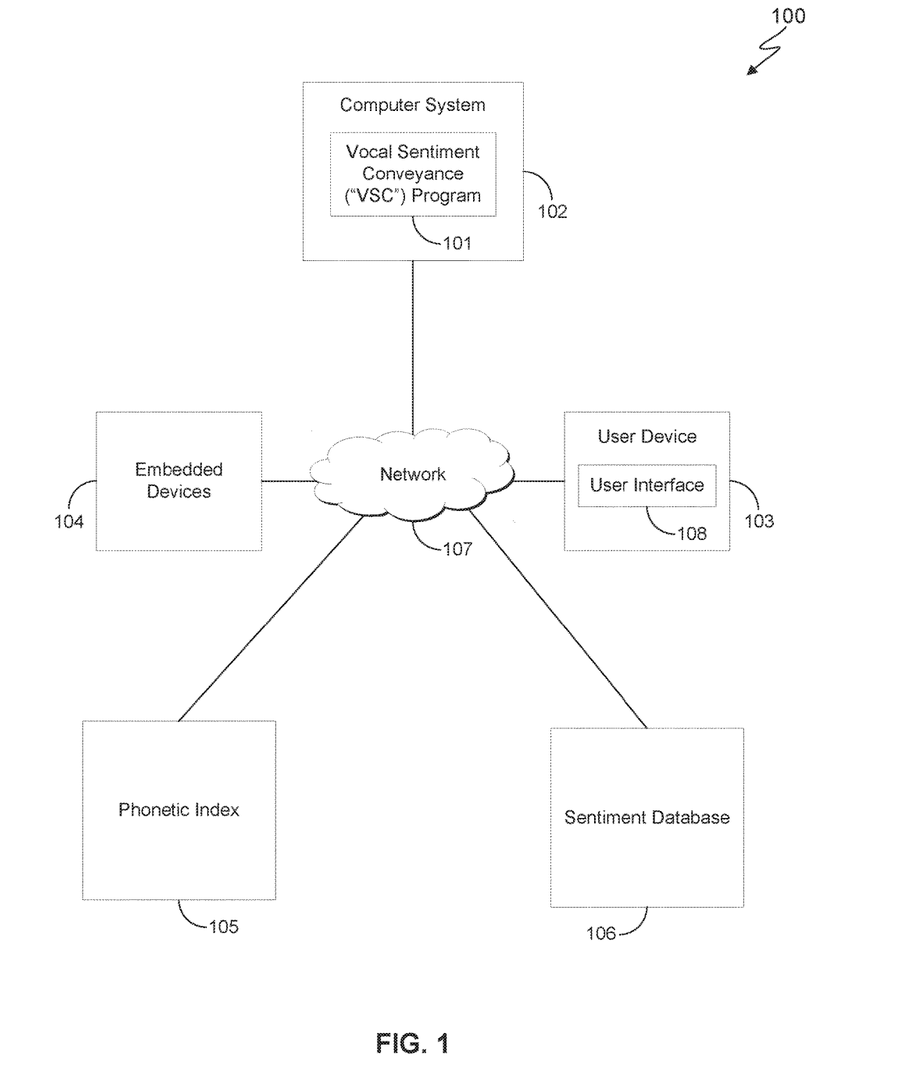
FIG. 1 is a functional block diagram of a computing environment suitable for operation of a Vocal Sentiment Conveyance program in accordance with at least one embodiment of the invention.

Referring now to various embodiments of the invention in more detail, FIG. 1 is a functional block diagram of a computing environment, generally designated 100, suitable for operation of a vocal sentiment conveyance ("VSC") program in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer system 102, user device 103, network of embedded devices 104, phonetic index 105, and sentiment database 106 interconnected over network 107. Network 107 can be, for example, a telecommunications network, a local area network (LAN), a wide area network (WAN), such as the Internet, or a combination of the three, and can include wired, wireless, or fiber optic connections. Network 107 may include one or more wired and/or wireless networks that are capable of receiving and transmitting data, voice, and/or video signals, including multimedia signals that include voice, data, and video information. In general, network 107 may be any combination of connections and protocols that will support communications between computer system 102, user device 103, network of embedded devices 104, phonetic index 105, sentiment database 106, and other computing devices (not shown) within computing environment 100.

User device 103 can be a laptop computer, tablet computer, smartphone, smartwatch, or any programmable electronic device capable of communicating with various components and devices within computing environment 100, via network 107. In general, user device 103 represents any programmable electronic device or combination of programmable electronic devices capable of executing machine readable program instructions and communicating with other computing devices (not shown) within computing environment 100 via a network, such as network 107. User device 103 includes user interface 108.

User interface 108 provides an interface between user device 103 and computer system 102. In one embodiment, user interface 108 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 108 may also be mobile application software that provides an interface between user device 103 and computer system 102. Mobile application software, or an "app," is a computer program that runs on smartphones, tablet computers, smartwatches and any other mobile devices. User interface 108 enables user device 103 to generate text-based messages via email or text-message, as well as share, exchange, or "post" information, ideas, text, pictures/videos, emoticons, etc. to various social media platforms (e.g., blogs, online forums, and social networks, such as Facebook® and Twitter®) via network 107.

Embedded devices 104 are a network of physical objects or "things" embedded with electronics, software, sensors, and network connectivity, which enable these objects to collect and exchange data. Embedded devices 104 allow physical objects, both animate and inanimate, to be sensed and/or controlled remotely across existing network 107, creating opportunities for more direct integration between the physical world and computer-based systems, such as computer system 102. In some embodiments, embedded devices 104 are "nodes" in a wireless sensor network ("WSN"). Here, the WSN may include spatially distributed autonomous sensors that detect the one or more input variables of an individual during generation of text-based messages via mobile device 103. Typically, each sensor network node has several parts, including a radio transceiver with an internal antenna or connection to an external antenna, a microcontroller, an electronic circuit for interfacing with the sensors, and an energy source (e.g., a battery or embedded form of energy harvesting). Embedded devices 104 identify, gather and analyze input data to determine a current emotional state of an individual at the time a text-based message is generated. In embodiments of the invention, embedded devices 104 may be entirely spatially separate, partially integrated, or fully integrated with user device 103. Embedded devices 104 may include, but are not limited to input sensors (e.g., heat sensors, moisture content sensors, motion sensors, EEG sensors, keystroke input sensors, and vocal sensors), cameras, and microphones.

In some embodiments, the WSN communicates with a Local Area Network ("LAN") or Wide Area Network ("WAN") through a gateway, which acts as a bridge between the WSN and another network, such as network 107. Here, VSC program 101 receives data from embedded devices 104 through various messaging protocols, including, but not limited to message queuing telemetry transport ("MQTT"), advanced messaging queuing protocol ("AMQP"), internet engineering task force ("IETF") constrained application protocol ("CoAP"), and extensible messaging and presence protocol ("XMPP").

Phonetic index 105 and sentiment database 106 are configured to store various information to be accessed and analyzed by VSC program 101. In embodiments of the invention, phonetic index 105 stores labeled training data (i.e., vocal samples) of intonational attributes corresponding to a user of user device 103. For example, intonational attributes include, but are not limited to pitch envelope (i.e., a combination of the speaking fundamental frequency, pitch range, and the shape and timing of the pitch contour), overall speech rate, utterance timing (i.e., duration of segments and pauses), vocal quality, and intensity (i.e., loudness).

In embodiments of the invention, sentiment database 106 stores baseline sensory information, keystroke information, facial expression information, non-verbal gestures and non-lexical communications corresponding to a user of user device 103. Sensory information may include, but is not limited to body temperature, moisture (i.e., sweat) level, pulse rate, respiration rate, and blood pressure. Keystroke information may include, but is not limited to keystroke dynamics (i.e., the manner and rhythm in which an individual types characters on a keyboard, keypad, or touchscreen). Non-verbal communications may include, but are not limited to facial expressions, gestures, eye contact, and posture.

Figure 2:
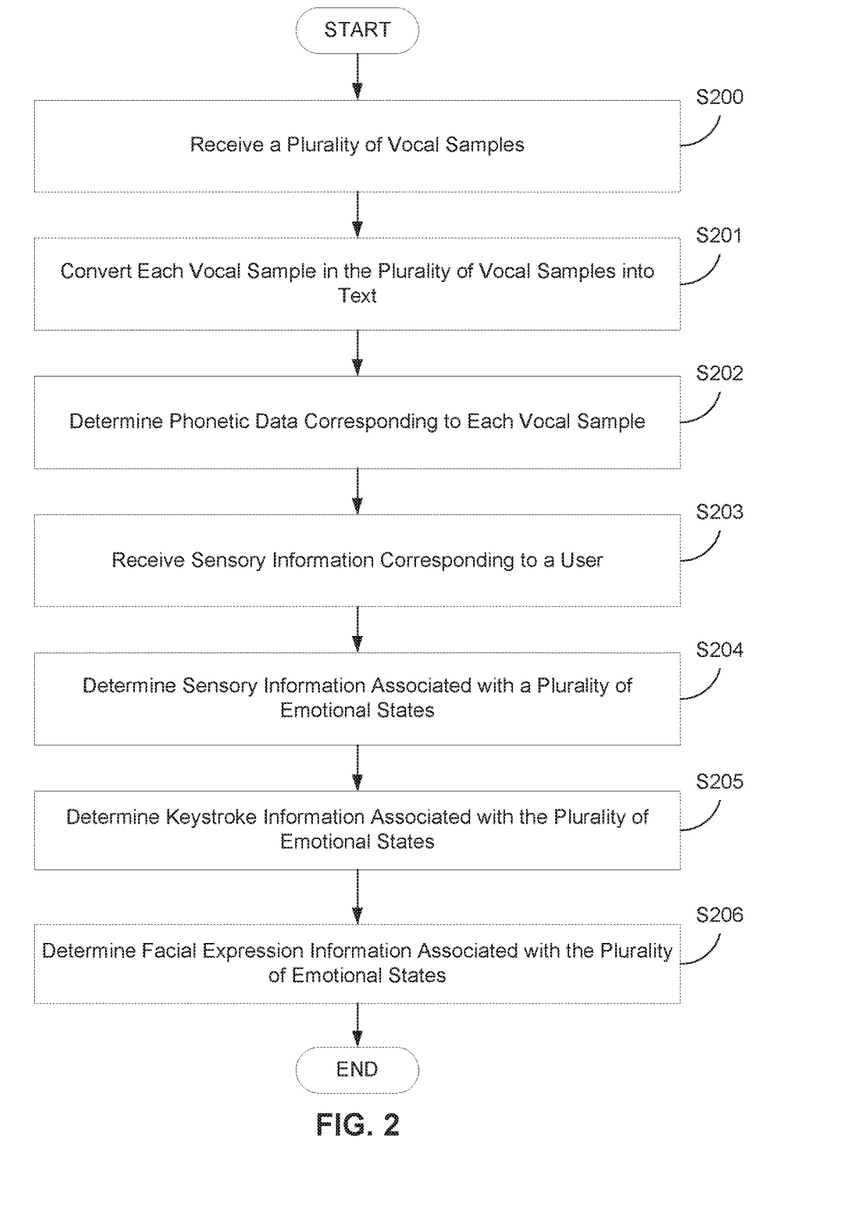
FIG. 2 is a flow chart diagram depicting operational steps for a Vocal Sentiment Conveyance in accordance with at least one embodiment of the invention.

FIG. 2 is a flow chart diagram depicting operational steps for a VSC program in accordance with at least one embodiment of the invention. At step S200, VSC program 101 receives a plurality of vocal samples. The plurality of vocal samples corresponds to a plurality of emotional states. In embodiments of the invention, VSC program 101 prompts a user of user device 103 to read from preselected sentences or passages. In some embodiments, VSC program 101 directs the user to speak in a tone that corresponds to a particular emotional state. For example, VSC program 101 directs the user to recite the sentence "I cannot believe the mess you have made" in an angry tone. In another example, VSC program 101 directs the user to recite the sentence "I really needed another pair of socks like a hole in the head" in a sarcastic tone. In some embodiments, VSC program 101 does not direct the user to speak in a particular tone. Here, the user dictates which tones to use when reciting a preselected sentence or passage. VSC program 101 stores the vocal samples in phonetic index 105.

At step S201, VSC program 101 converts each vocal sample in the plurality of vocal samples into text. In embodiments of the invention, VSC program 101 converts the plurality of vocal samples into text with "speech recognition" (SR) software (i.e., "automatic speech recognition" (ASR) software, "computer speech recognition" software, or "speech to text" (STT) software). In embodiments of the invention, converting the plurality of vocal samples into text includes comparing sounds corresponding to each vocal sample with word sequences. More specifically, VSC program 101 compares sounds corresponding to each vocal sample to a language model. A language model provides context to distinguish between words and phrases that sound similar (e.g., "recognize speech" and "wreck a nice beach" are pronounced similarly but have very different meanings).

In some embodiments, VSC program 101 compares sounds corresponding to each vocal sample to a positional language model. A positional language model describes the probability of given words occurring close to one another, but not necessarily immediately adjacent, in a text.

In some embodiments, converting the plurality of vocal samples into text includes generating an acoustic model that textually represents the relationship between each audio vocal sample and the phonemes or other linguistic units that make up speech. The acoustic model includes statistical representations of the sounds that make up each word.

In embodiments of the invention, converting the plurality of vocal samples into text includes generating a pronunciation model for each word corresponding to each vocal sample. More specifically, the pronunciation model is derived from the combination of the language model and the acoustic model. The pronunciation model includes a definition of the elemental sounds in a language (i.e., phonemes), a dictionary that describes how words in a language are pronounced, and post-lexical rules for altering pronunciation of words spoken in a context.

At step S202, VSC program 101 determines phonetic data corresponding to each vocal sample. In embodiments of the invention, VSC program 101 segments each vocal sample via speech recognition software. Here, VSC program 101 segments each vocal sample into one or more of the following units: phones, diphones, half-phones, syllables, morphemes, words, phrases, and sentences. The units are then indexed in phonetic index based on the segmentation and acoustic parameters, such as the fundamental frequency (pitch), duration, position in the syllable, and neighboring phones. In embodiments of the invention, phonetic data may include, but is not limited to length (i.e., the duration of a sound or sequence of sounds, measured in milliseconds), duration (i.e., the length of time that it takes to speak a speech unit (word, syllable, phoneme, allophone, etc.), intonation (i.e., the pattern of pitch changes which occur during a phrase or sentence (e.g., the statement "You live here" and the question "You live here" will have different intonation patterns), pitch (i.e., the perceived property of a sound or sentence by which a listener can place it on a scale from high to low), prosody (i.e., the rhythm, modulation, and stress patterns of speech), rate (the speed at which speech is uttered), speech style, and volume. In some embodiments, VSC program 101 correlates portions of phonetic data with one or more emotional states. VSC program 101 stores the various data corresponding to the vocal samples in phonetic index 105.

At step S203, VSC program 101 receives sensory information corresponding to a user of user device 103. In embodiments of the invention, VSC program 101 determines baseline sensory information of an individual based on information transmitted from network of embedded devices 104. In some embodiments, VSC program 101 determines one or more of the following baseline sensory readings: heart rate, body temperature, blood pressure, moisture content, and EEG. Baseline sensory readings may be taken when an individual is at rest or sleeping. For example, VSC program 101 receives blood pressure readings and heart rate readings from a wearable device (e.g., Fitbit®). In another example, VSC program 101 receives body temperature readings from a wearable device (e.g., Tempdrop™ device or TempTraq® device). In yet another example, VSC program 101 receives breathing pattern readings from a wearable biosensor device (CardioChip™ ECG). In a further example, VSC program 101 receives EEG readings an embeddable device (e.g., NeuroSky® EEG biosensor).

At step S204, VSC program 101 determines an individual's sensory information associated with different emotional states. In an embodiment, VSC program 101 determines an individual's sensory information associated with an emotional state based on comparing the context of text written by an individual and the individual's sensory information at the time the text was written. More specifically, VSC program 101 determines an individual's sensory information corresponding to an emotional state based on sentiment information corresponding to the written text. For example, VSC program 101 engages in sentiment analysis (i.e., opinion mining) to determine the attitude (i.e., emotional state) of an individual with respect to a particular topic. VSC 101 may engage in sentiment analysis through the use of an analytics engine. In an embodiment of the invention, VSC program 101 employs natural language processing ("NLP") software and text analysis (i.e., deriving high-quality information from text through the devising of patterns and trends through means such as statistical pattern learning) to identify and extract subjective information from the text. For example, VSC program 101 may classify emotional states (e.g., "angry," "sad," and "happy") of a text-based messaged based on information derived from NLP software. In some embodiments, VSC program 101 correlates sensory information received at the time the text is generated to an emotional state. VSC program 101 stores the sensory information in sentiment database 106.

At step S205, VSC program 101 determines an individual's keystroke information associated with different emotional states. Here, VSC program 101 analyzes keyboard typing patterns (e.g., keystroke timing attributes, text patterns, and pressure) corresponding to the type and/or context of words and sentences typed by a user of user device 103 over a given period of time. For example, VSC program 101 monitors and records keystroke information on text generated through mobile device 103 for a period of one week. In an embodiment, VSC program 101 employs NLP and text analysis on the text generated during the one week period to identify emotional states associated with the text. Based on identifying various emotional states associated with the words and sentences of text generated through mobile device over the one week period, VSC program 101 correlates keyboard typing patterns to emotional states of an individual. VSC program 101 stores keystroke information in sentiment database 106.

At step S206, VSC program 101 determines an individual's facial expressions associated with different emotional states. In some embodiments, VSC program 101 presents an individual with a plurality of pictures, wherein each picture is known to invoke a particular emotion. In an embodiment, VSC program 101 captures an image of the individual's facial expression via a built-in camera located on mobile device 103. VSC program 101 correlates each image of the individual's facial expression to the particular emotion invoked by each picture. In some embodiments, VSC program 101 monitors and records various images of an individual's spontaneous facial expressions for a given period of time. In some embodiments, VSC program 101 receives various images of an individual's posed facial expressions. In an embodiment, VSC program 101 uses facial recognition software to analyze each facial expression depicted in an image for various factors (e.g., geometric deformations of facial features, density of wrinkles appearing in certain facial regions, and degree of a smile). Based on the intensity or degree of each factor, VSC program 101 compares each facial expression to labeled images of known facial expressions to identify an emotional state corresponding to the facial expression. VSC program stores facial expression information in sentiment database 106.

Figure 3:
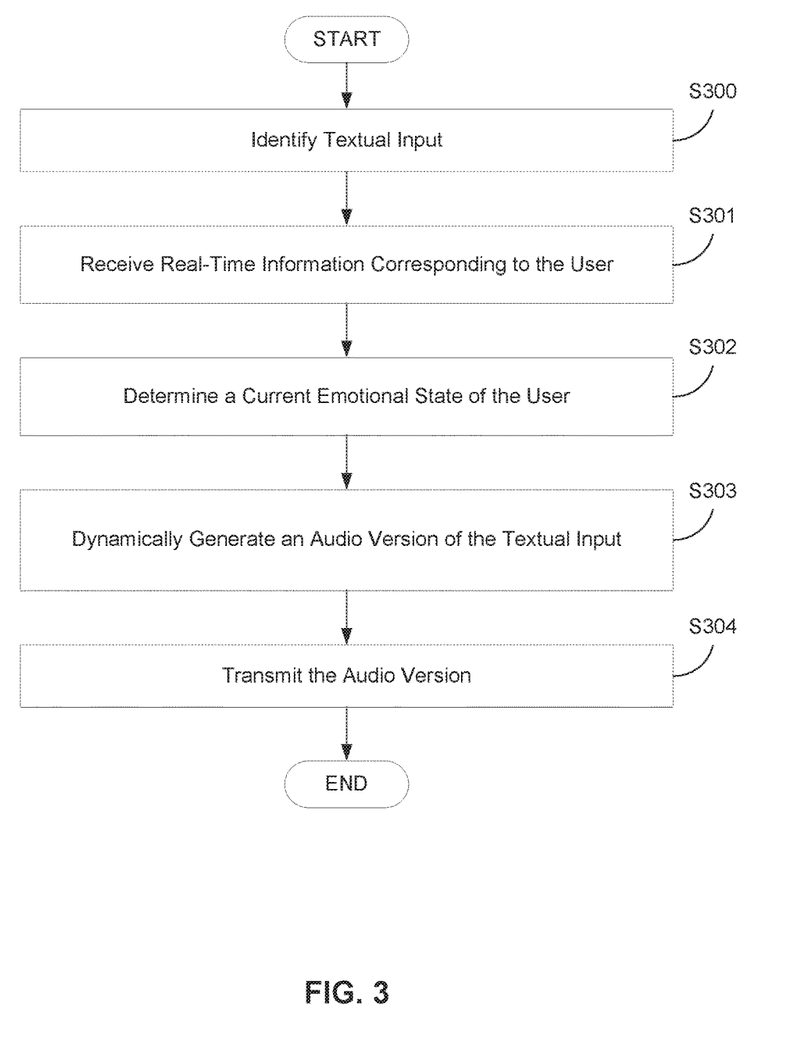
FIG. 3 is a flow chart diagram depicting operational steps for a Vocal Sentiment conveyance in accordance with at least one embodiment of the invention.

FIG. 3 is a flow chart diagram depicting operational steps for a VSC program in accordance with at least one embodiment of the invention. It should be presumed that, prior to carrying out the operational steps as depicted in FIG. 3, all vocal sample data and baseline sensory information, keystroke information, and facial expression information has been previously recorded and stored in phonetic index 105 and sentiment database 106, respectively. However, it should be appreciated that various embodiments of the invention may be carried out without the use of the information stored in phonetic index 105 and sentiment database 106.

At step S300, VSC program 101 identifies textual input. In embodiments of the invention, VSC program 101 identifies textual input from a user of user device 103. In some embodiments, VSC program 101 identifies textual input generated via email or an SMS application. In some embodiments, VSC program 101 identifies textual input generated via various social platforms, including but not limited to blogs, online forums, Facebook®, and Twitter®. In an embodiment, VSC program 101 identifies textual input via speech-to-text software. Here, a verbal communication is received as input and text corresponding to the verbal communication is generated as output.

At step S301, VSC program 101 receives real-time information. In embodiments of the invention, the real-time information corresponds to a user of user device 103. Real-time information should be understood as information received from network of embedded devices 104 and/or mobile device 103 during a period of time immediately prior to, during, or immediately after the generation of textual input via user device 103. Real-time information may include, but is not limited to sensory information, keystroke information, facial expression information, non-lexical vocalizations, and non-verbal gestures. In an embodiment of the invention, VSC program 101 receives a constant stream of real-time information. In an embodiment of the invention, VSC program 101 receives real-time information upon detecting user input (e.g., touch screen finger gestures, text input via keyboard or touchscreen, and use of built-in camera or microphone) via mobile device 103.

At step S302, VSC program 101 determines a current emotional state of an individual. In embodiments of the invention, VSC program 101 determines a current emotional state of an individual based, at least in part, on the real-time information. In some embodiments, VSC program 101 further determines an emotional context associated with the textual input through the use of NLP software and text analysis. In embodiments of the invention, VSC program 101 compares information stored in phonetic index 105 and sentiment database 106 to the real-time information in order to determine an individual's current emotional state immediately prior to, during, or after the generation of textual input via user device 103. For example, VSC program 101 receives the following real-time sensory information from embedded devices 104 and/or mobile device 103 during the generation of a text-based message via user device 103: heart rate reading (160 beats per minute (BMP)), body temperature reading (98.8° Fahrenheit), and blood pressure reading (150 millimeters (mm) of mercury (Hg)/100 mm Hg). VSC program 101 compares the real-time sensory information to the following baseline sensory information stored in sentiment index 106: heart rate reading (120 BMP), body temperature reading (98.6° Fahrenheit), and blood pressure reading (120 mmHg/80 mmHg).

In some embodiments, VSC program 101 correlates the real-time sensory information with one or more emotional states. For example, an elevated heart rate reading may be linked to the emotional state "excited." In another example, an elevated blood pressure reading may be linked to the emotional state "angry." Accordingly, since the real-time heart rate reading (160 BMP) is elevated relative to the baseline heart rate reading (120 BMP), VSC program 101 may determine a current emotional state of "excited." Similarly, since the real-time blood pressure reading (150 mmHg/100 mmHg) is elevated relative to the baseline blood pressure reading (120 mmHg/80 mmHg), VSC program 101 may determine a current emotional state of "anger." In some embodiments, an elevated reading may be understood as any real-time sensory reading above a baseline sensory reading stored in sentiment database 106. In other embodiments, an elevated reading may be understood as any real-time sensory reading above a medically accepted "normal" or "safe" threshold.

In an embodiment, VSC program 101 correlates real-time sensory information with one or more emotional states if the real-time sensory information is above a given threshold. For example, an elevated heart rate reading is linked to the emotional state "anger" if a heart rate reading in excess of 150 BMP is received. In another example, detection of pacing is linked to the emotional state "anxious" if pacing is detected for more than a threshold period of time (e.g., 20 seconds). In yet another example, an elevated blood pressure reading is linked to the emotional state "excited" if a blood pressure reading in excess of 130 mm Hg/95 mm Hg is received.

In some embodiments, VSC program 101 determines a current emotional state on an individual based on comparing real-time keystroke information to keystroke information stored in sentiment database 106. In some embodiments, VSC program 101 compares keystroke information stored in sentiment database 106 to real-time keystroke information in order to determine an individual's current emotional state at the time a text-based message is generated. In some embodiments, VSC program 101 correlates real-time keystroke information with one or more emotional states. For example, increased keystroke pressure may be linked to the emotional state "angry." In another example, decreased text patterns (e.g., fewer words typed per minute or the repeated use of the backspace or delete function) may be linked to the emotional state "nervous," "anxious," or "indecisive."

In an embodiment, VSC program 101 correlates real-time keystroke information with one or more emotional states if the real-time keystroke information is above a given threshold. For example, elevated keystroke detection is linked to the emotional state "excited" if a keystroke reading in excess of 100 keystrokes per minute is received. In another example, detection of the use of the delete function in excess of 5 times during the generation of a single text-based message is linked to the emotional state "worried."

In some embodiments, VSC program 101 determines a current emotional state based on comparing real-time facial expression information captured immediately prior to, during, or immediately after the generation of textual input via user device 103 to facial expression information stored in sentiment database 106. In an embodiment of the invention, VSC program 101 receives a constant stream of real-time images containing facial expression information. For example, VSC program 101 regularly (e.g., every 5 seconds) captures an image a user of user device 103. In an embodiment of the invention, VSC program 101 receives real-time images containing facial expression information upon detecting user input (e.g., touch screen finger gestures, text input via keyboard or touchscreen, or use of a built-in camera function) via mobile device 103.

In some embodiments, where facial expression information has not been previously captured and stored in sentiment database 106, VSC program 101 determines a current emotional state based on real-time facial expression information alone. In this case, VSC 101 employs a visual sentiment ontology, corresponding image dataset and image analysis (i.e., deriving high-quality information from object in an image or video sequence through the devising of patterns and trends through machine learning methods). A visual sentiment ontology may be understood as a collection of semantic concepts, wherein each concept is composed of adjective and a noun (e.g., "happy face" or "sad face"). Each concept may be associated with a collection of images that represent the concept. Furthermore, each concept may be associated with a negative, neutral, or positive sentiment. Using supervised machine learning, such as pattern recognition, the collection of images that represent each concept may be used to train sentiment classifiers. Here, a sentiment classifier may assign each input value (e.g., real-time facial expression information captured from an image or video) to one of a given set of classes (e.g., negative, neutral, or positive sentiment) and/or one of a given set of emotions (e.g., happy, angry, and worried).

In some embodiments, VSC program 101 analyzes non-lexical vocalizations to determine a current emotional state. Non-lexical vocalizations include, but are not limited to grunts, exclamations, sighs, laughs, cries, and shouts. In an embodiment, VSC program 101 receives a constant stream of verbal communications. For example, VSC program 101 continuously receives verbal communications by accessing a built-in microphone function available on mobile device 103. In an alternative embodiment, VSC program 101 accesses a built-in microphone function available on mobile device 103 upon detecting user input (e.g., touch screen finger gestures, text input via keyboard or touchscreen) via mobile device 103. In either embodiment, VSC program 101 does not record or store the verbal communications, but merely analyzes the verbal communications to detect non-lexical vocalizations. Detection of non-lexical vocalizations can be used to further support a likelihood of a determined emotional state. For example, if the emotional state "frustrated" is determined based on a comparison of real-time facial expression information to facial expression information stored in sentiment database, the detection of a grunting sound may further support the likelihood that an individual is in fact frustrated.

In some embodiments, VSC program 101 analyzes non-verbal gestures to determine a current emotional state. Non-verbal gestures are visible movements of the body, hand, or face and include, but are not limited to posture, winking, nodding, rolling of the eyes, shrugging of the shoulders, and crossing of the arms. In an embodiment, VSC program 101 receives a constant stream of images containing non-verbal gestures. For example, VSC program 101 continuously receives images containing non-verbal gestures by accessing a built-in camera function available on mobile device 103. In an alternative embodiment, VSC program 101 accesses a built-in camera function available on mobile device 103 upon detecting user input (e.g., touch screen finger gestures, text input via keyboard or touchscreen, or use of a built-in camera function) via mobile device 103. In either embodiment, VSC program 101 does not record or store the images, but merely analyzes the images to detect non-verbal gestures. Detection of non-verbal gestures can be used to further support a likelihood of a determined emotional state. For example, if the emotional state "frustrated" is determined based on a comparison of real-time facial expression information to facial expression information stored in sentiment database, the detection of crossing of the arms may further support the likelihood that an individual is in fact frustrated.

At step S303, VSC program 101 dynamically generates an audio version of the textual input. In embodiments of the invention, VSC program 101 dynamically generates an audio version of the textual input based, at least in part, on the determined current emotional state and the phonetic data stored in phonetic index 105. More specifically, the current emotional state is determined based, at least in part, on the real-time information.

In an embodiment, the textual input is converted into a Unicode format (i.e., a universal encoding standard used for representing text for computer processing). In an alternative embodiment, the textual input is converted into a speech synthesis mark-up language (SSML) format. In embodiments of the invention, the raw text containing symbols (e.g., numbers and abbreviations) is converted into the equivalent of written-out words through text normalization (i.e., pre-processing or tokenization).

In embodiments of the invention, VSC program 101 assigns phonetic transcriptions to each written-out word according to phonetic data stored in phonetic index 105 using text-to phoneme software (i.e., grapheme-to-phoneme conversion software). In embodiments of the invention, VSC program 101 further divides and marks the written-out words into prosodic units (e.g., phrases, clauses, and sentences). In some embodiments, VSC program 101 selects and assigns phonetic transcriptions through the use of unit selection software. Unit selection software determines the best chain of candidate units from phonetic index 105 to be assigned to each written-out word based on a weighted decision tree. In embodiments of the invention, VSC program 101 converts the phonetic transcriptions and prosodic units into sound waveforms via speech synthesizer software. It should be appreciated that in various embodiments of the invention, the output of the audio version of the textual input is in the user's natural voice.

At step S304, VSC program transmits an audio version of the textual input. In embodiments, the audio version may be transmitted alone or concurrently with the textual input, such as an email or text-message.

In an alternative embodiment, VSC program 101 determines if the words chosen by the user to generate the text-based message correspond to the user's current emotional state. Oftentimes, an individual may speak or write in a language that is not their native language. Although the individual may properly convey the substantive content in their message, they may struggle with conveying the proper emotional context. In this embodiment, VSC program 101 compares the user's current emotional state with an emotional context associated with the text-based message. In some embodiments, VSC program 101 determines an emotional context associated with the text-based message through the use of NLP software and text analysis. In an embodiment, if the emotional context associated with the text-based message corresponds to the user's current emotional state, the user is notified that message corresponds to the user's emotional state. In an embodiment, if the emotional context associated with the text-based message does not correspond to the user's current emotional state, VSC program 101 flags one or more words or phrases that incorrectly convey the user's current emotional state. For example, flagging includes, but is not limited to underlining, highlighting, and changing the font (e.g., bolding, italicizing, color, and style). In an embodiment, VSC program 101 automatically corrects (i.e., auto-correct) one or more words or phrases to better convey the user's current emotional state. In an embodiment, VSC program 101 provides the user with a drop-down menu with an available selection of alternative words or phrases to better convey the user's current emotional state.

Figure 4:
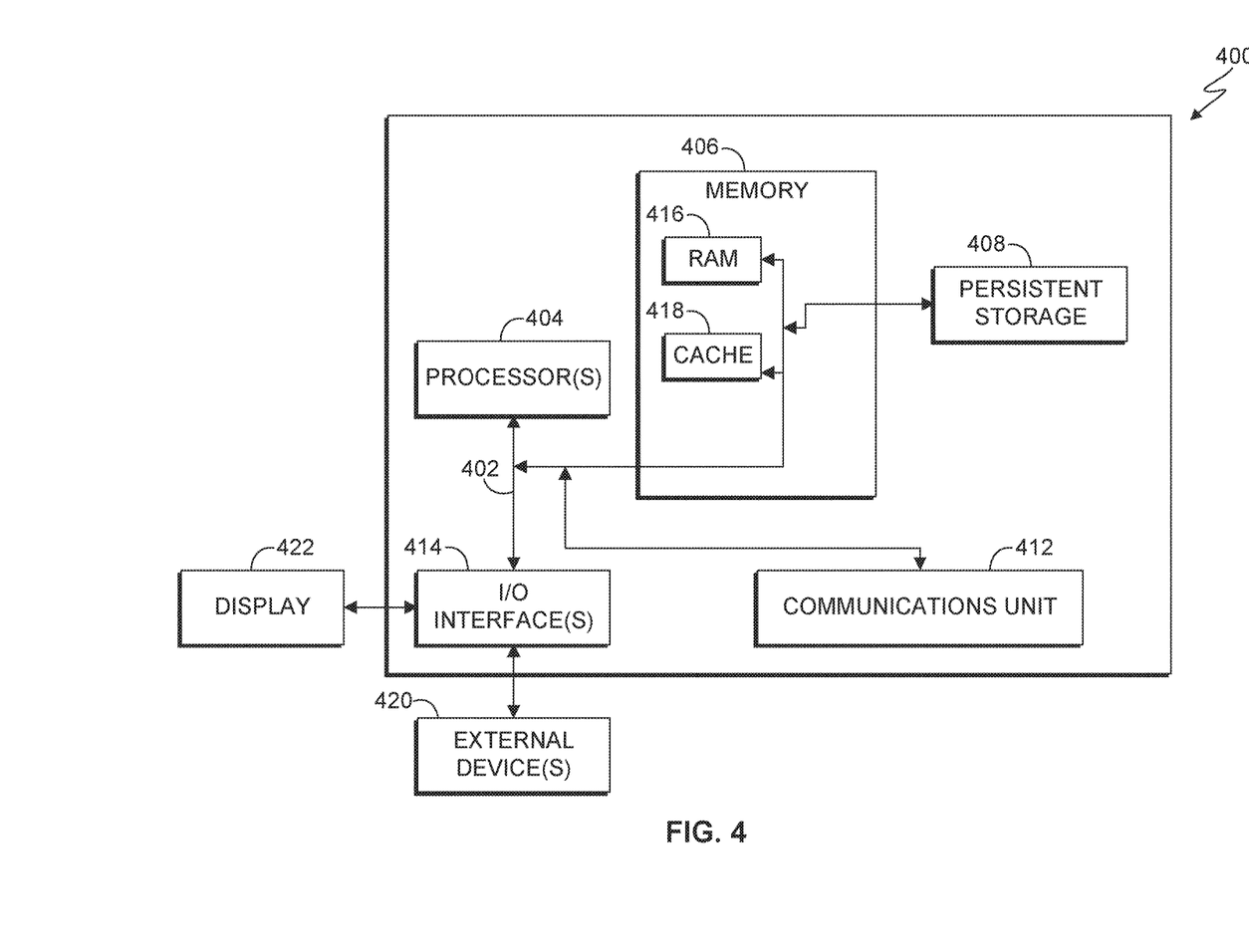
FIG. 4 is a block diagram depicting components of a computer suitable for executing a Vocal Sentiment Conveyance program in accordance with at least one embodiment of the invention.

FIG. 4 is a block diagram depicting components of a computer 400 suitable for executing VSC program 101, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for VSC program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assigning phonetic data to a textual message for synthesis of an audio version of the textual message, the method comprising the steps of:
   receiving, from a user of a mobile device, a plurality of vocal samples;
   determining a first set of phonetic data from the plurality of vocal samples based, at least in part, on:
      segmenting each vocal sample in the plurality of vocal samples into a plurality of phonetic units; and
      identifying a plurality of acoustic parameters corresponding to each of the plurality of phonetic units;
   indexing a first set of phonetic units derived from the plurality of phonetic units based, at least in part, on:
      identifying a correlation between acoustic parameters corresponding to phonetic units segmented from the plurality of vocal samples and a first emotional state of the user during a period of time in which each of the vocal samples are generated;
   determining, based on physical characteristics associated with the user of the mobile device, the first emotional state of the user during a period of time which the textual message is generated via the mobile device;
   comparing the first emotional state of the user with a context of the textual message;
   determining, based on the comparison, that the first emotional state of the user matches the context of the textual message;
   assigning, in response to determining that the first emotional state of the user matches the context of the textual message, acoustic parameters associated with those phonetic units in the first set of phonetic units that correspond to phonetic transcriptions of the textual message, wherein: the acoustic parameters are predicted to convey, to a listener, the first emotional state of the user; and
   synthesizing, via speech synthesizer software, an audio version of the textual message based, at least in part, on the acoustic parameters.

2. The method of claim 1, wherein determining the first emotional state of the user is further based on:
   comparing baseline physical characteristics corresponding to the user with real-time physical characteristics corresponding to the user.

3. The method of claim 1, further comprising:
   comparing the emotional context of the textual message with the first emotional state of the user; and
   determining that one or more words associated with the textual message do not correspond to the first emotional state of the user.

4. The method of claim 3, wherein:
   responsive to determining that the one or more words do not correspond to the first emotional state of the user, flagging the one or more words that do not correspond to the first emotional state of the user.

5. The computer method of claim 4, further comprising:
   suggesting one or more replacement words for the one or more words that are flagged.

* * * * *